United States Patent
Boots et al.

[15] 3,698,135
[45] Oct. 17, 1972

[54] VEHICLE PARKING SPACE LOCKING DEVICE

[72] Inventors: Patrick R. Boots; Kenneth W. Gaddis, both of Houston, Tex.

[73] Assignee: Scope Lock, Inc., Houston, Tex.

[22] Filed: Sept. 17, 1971

[21] Appl. No.: 181,512

[52] U.S. Cl. ..........................49/35, 49/49, 49/131
[51] Int. Cl. ...............................E01f 13/00
[58] Field of Search....49/35, 49, 131, 132, 133, 134; 94/1.5

[56] References Cited

UNITED STATES PATENTS

| 1,698,966 | 1/1929 | Quick | 116/63 P |
|---|---|---|---|
| 3,061,960 | 11/1962 | Dull | 49/35 |
| 3,086,430 | 4/1963 | Emmel | 94/1.5 X |
| 3,417,508 | 12/1968 | Sprung | 49/35 |
| 3,451,164 | 6/1969 | Kappelman | 49/35 |
| 3,530,775 | 9/1970 | Bowersox | 94/1.5 |
| 3,564,769 | 2/1971 | Wilson et al. | 49/35 |

Primary Examiner—Dennis L. Taylor
Attorney—Ralph R. Browning

[57] ABSTRACT

A device for use with a substantially unenclosed parking space to selectively permit ingress and egress from the parking space comprising an erectable barrier means operatively mounted in the surface of the associated parking space for selectively raising and lowering. The device is provided with dual locking means, each of which permits locking and unlocking of the erectable barrier means in the raised position. One of the locking means is adapted to allow release of the erectable barrier means from the remainder of the device for repair or replacement.

13 Claims, 3 Drawing Figures

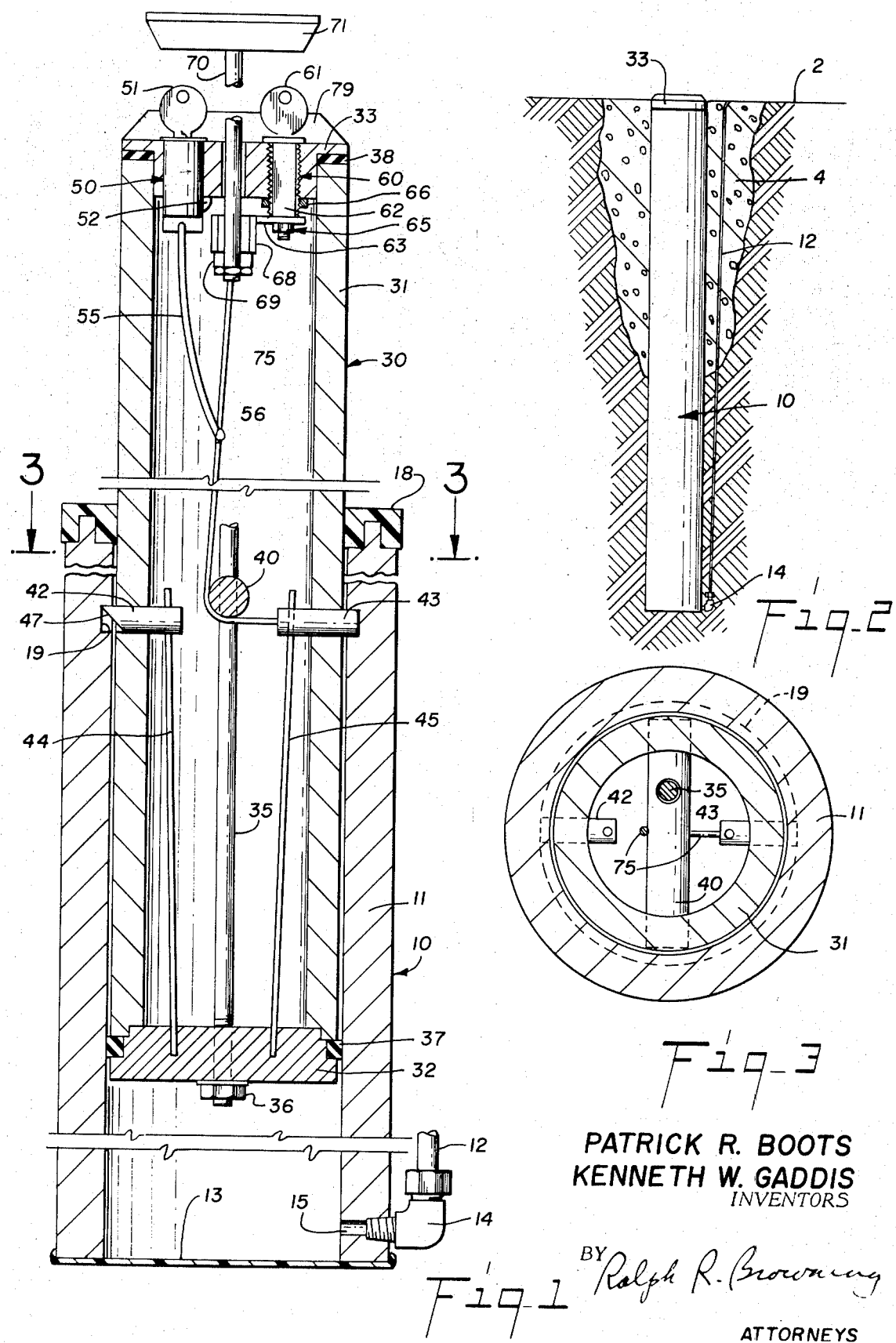
PATENTED OCT 17 1972
3,698,135
PATRICK R. BOOTS
KENNETH W. GADDIS
INVENTORS
BY Ralph R. Browning
ATTORNEYS

VEHICLE PARKING SPACE LOCKING DEVICE

BACKGROUND OF THE INVENTION

1. Field of the Invention

The present invention relates to a device for controlling the movement of vehicular traffic into or out of a vehicle parking space. More particularly, the present invention relates to a device for use in conjunction with a substantially unenclosed parking space to prevent unauthorized occupancy of the same or to prevent unauthorized removal of a vehicle from the space.

2. Description of the Prior Art

In multi-unit apartment complexes, parking facilities for vehicles owned by the tennants generally consist of carports with assigned parking spaces or completely open parking spaces, completely enclosed parking areas such as that provided by a garage not being available. While the use of a carport or other such covering gives some protection against weather and thereby protects the car in this respect, a carport is wholly inadequate as a means of preventing theft of the vehicle from the parking space. It is well-known that the theft of vehicles from apartment complexes is high and is increasing at an alarming rate. While proper locking of a car discourages its theft, it does not absolutely prevent it, as is well evidenced by the number of locked cars which are stolen each year.

Other than the possible theft of the vehicle from an unenclosed parking space, vehicle parking in apartment complexes and other places where assigned parking is used presents the problem of unauthorized use of a reserved parking space. It is not uncommon for a reserved parking space to be occupied by an unauthorized vehicle, thus leaving the one authorized to use the parking place without a space to leave his vehicle. Such occurrences are not only annoying but often lead to the damage of cars when attempts are made to remove the unauthorized vehicle from the parking space.

Various attempts have been made in recent years to devise apparatus which would prevent the removal of an authorized vehicle from its assigned parking space and which would prevent the use of such a space by an unauthorized vehicle. One such device is disclosed in U.S. Pat. No. 3,451,164 to Kappelman. However, until the present invention, no one seems to have developed a completely foolproof device. Those of the prior art have several disadvantages including external disassembly, susceptability to entry by a pipe cutter or saw, vulnerable to damage by maintenance equipment such as snow plows, etc. Neither do they provide for separate operation by tennants and managers or for easy removal to repair or replace the operating portion without disrupting the installation of the unit in the ground.

SUMMARY OF THE INVENTION

The device of the present invention comprises an erectable barrier operatively mounted in the surface of a parking space with means for raising and lowering the erectable barrier and means for releasably maintaining it in the raised position. Thus, the device may be used for selectively permitting ingress and egress from the parking space. It also prevents the theft of a vehicle from a substantially unenclosed parking space and prevents unauthorized occupancy of the space.

The present invention offers many advantages over the devices of the prior art. There are no external bolts or screws making disassembly from the outside impossible. The device may be provided with two locks, one for the tennant and one for the manager. One of the locks may provide a means for removing the erectable barrier for repair or replacement. The erectable barrier of the present invention swivels or turns 360° preventing entry by a pipe cutter or saw. In the lowered position, the device of the present invention may be substantially level with the surface of the parking space allowing operation of snow plows or other maintenance equipment.

Other objects and advantages of the invention will be apparent from the accompanying drawings and specification which follows.

BRIEF DESCRIPTION OF THE DRAWINGS

FIG. 1 is a longitudinal section view of a preferred embodiment of the invention;

FIG. 2 is an elevational view of the embodiment of FIG. 1 showing its installation in the surface of a parking space, with which it is to be used; and FIG. 3 is a horizontal cross-section of the embodiment of FIG. 1 taken along line 3—3 thereof.

BRIEF DESCRIPTION OF THE PREFERRED EMBODIMENTS

Referring now to the drawings, there is shown a vehicle parking space locking device comprising a rigid tubular housing 10 telescopically receiving a cylindrical, erectable barrier 30. The entire device may be installed in the ground as shown in FIG. 2, by placing the housing 10 in a hole so that the upper end of the device is substantially flush with the surface 2 of a parking space with which it is to be used. The device may be anchored or grouted in the hole by pouring a sufficient amount of cement 14 or the like around the housing 10. A drainage conduit 12, the purpose of which will be more fully understood hereafter, extends from a lower fitting 14 upwardly to the surface 2.

The housing 10 may comprise a tubular member 11 closed at the lower end by plate member 13. A drain hole 15 through tubular member 11 allows any fluid that may accumulate within the housing 10 to be forced through fitting 14 and conduit 12 to the surface 2. The cylindrical erectable barrier 30, when lowered from an upper position, acts as a piston within housing 10 to pump such accumulated water through the drain hole 15 and conduit 12. The upper end of the housing 10 may be provided with an annular weather seal member 18 to minimize the entrance of water into the interior of housing 10. The seal 18 may be of rubber or any other suitable resilient material. An annular locking or latch groove 19 may be machined on the interior of tubular member 11. The function of this groove 19 will be more clearly understood hereafter.

The erectable barrier 30 comprises a rigid tubular member 31 closed at opposite ends by lower plate 32 and upper plate 33. These plates 32, 33 and tubular member 31 may be rigidly held together by a connecting rod 35 which may be connected to the upper plate 33 from the underside thereof by any suitable means, for example, welding or threaded engagement with a tapped hole therein. The rod 35 may be threaded on its lower end for receiving a nut 36 so as to allow the disassembly of the erectable barrier 30. A horizontal guide rod 40 may be transversely disposed and attached in any suitable manner within tubular member 31. It may be inserted through horizontal holes drilled in the walls of tubular member 31. Seal members 37 and 38 provide a sealing connection between tubular member 31 and upper and lower plates 32, 33. In addition, lower seal 37 slidingly and sealingly engages the interior of housing tubular member 11 to permit the displacement of accumulated water through drain hole 15 by the pumping action previously described.

Slidingly disposed in holes provided therefor in tubular member 31 is a pair of latch members 42 and 43. Each of the latch members is attached to a corresponding biasing means such as cantilevered leaf springs 44 and 45. These springs bias the latches 42, 43 in an outward direction. When the erectable barrier 30 is raised to the position shown in FIG. 1, these latches 42, 43 will engage the latch groove 19, preventing further upward movement of the erectable barrier 30. One of the latches 42 is provided with a tampered cam surface 47 so that the latch 42 may be forced to automatically disengage the latch groove 19 on the lowering of the erectable barrier 30 from its raised position. The other latch 43 is not provided with such a surface and a horizontal force must be applied to it before the groove 19 can be disengaged to allow lowering of the barrier 30.

The upper plate 33 is provided with a pair of locking devices 50, 60, the purpose of which is primarily to selectively permit the release of latch 43 from groove 19. The locking mechanism 60, which may be operated by a key 61, normally in possession of the tennant, comprises a lock cylinder 62 and a rotating arm 63. The arm 63 may be attached to the cylinder 62 by a nut and bolt assembly 65. The lock cylinder 62 may be held in place by any suitable means such as snap ring 66. Attached to rotatable arm 63 is one-half of a split collar member 68 which in the locked position shown in FIG. 1 engages the shoulder of a washer or collar 69. The washer 69 is in turn fastened to the lower end of a handle rod 70 at the upper end of which is attached an operating handle 71. Attached to the handle rod 70 or washer 69 is a cable member 75 which extends therefrom around one side of transverse guide bar 40 for attachment to one end of latch 43. As long as the lock mechanism 60 is in the locked position, latch 42 will remain in its engaged position with groove 19, preventing either upward or downward displacement of the erectable barrier within the housing 10. By turning the key 61, the rotating arm 63, and consequently retaining collar 68, is rotated out of engagement with handle washer 69. This leaves the rod 70 free for upward displacement by pulling on handle 71. When the rod 70 and cable 75 are displaced upwardly, the latch 43 is retracted from groove 19, freeing the erectable barrier 30 for lowering to the surface flush position shown in FIG. 2.

The secondary lock mechanism 50 is operated by a key 51 which is normally in the possession of the manager. By turning the key 51, a latch 52 is retracted allowing the entire lock mechanism 50 to be removed from the top plate 53. Another short cable 55 is attached at one end to lock mechanism 50 and at the opposite end to the primary cable 75 by attachment means 56. Once the locking mechanism 50 is released, it may be pulled upwardly causing the cable 75, through cable 55, to retract latch 43 from groove 19.

In addition to serving a secondary locking release function, secondary lock mechanism 50 serves another unique function. When the lock 50 is released from plate 33, the hole vacated thereby provides access to tapered latch 42 and spring 44. By inserting the proper tool through this hole into engagement with the spring 44, latch 42 can be forced out of engagement with latch groove 19 permitting further upward displacement of the erectable barrier 30, and its ultimate removal from the housing 10, permitting replacement, repair, lock change-out, etc. This is the only way that the erectable barrier 30 can be removed from its housing 10. There are no external bolts or screws and since the entire erectable barrier 30 may be rotated 360° entry by means of a pipe cutter or saw is also prevented. Thus, the device is virtually theft-proof.

In its inoperative position, the locking device of the present invention would normally appear in the position of FIG. 2. With the keys removed, the handle 71 may be placed in a recess 79 of upper plate 33. In this position, the entire device is substantially below grade level. Thus maintenance equipment, such as snow plows, can be operated in the parking areas without fear of damage to the device.

When it is desired to erect the barrier 30 to either lock a vehicle in the associated parking space or to block entry into such space, the handle 71 is grasped by the operator and an upward force applied thereto. The erectable barrier is then displaced upwardly until latches 42, 43 engage the latch groove 19 preventing further upward displacement. The erectable barrier 30 is then automatically locked in the operative raised position, preventing removal of a vehicle from its associated parking space or preventing entry of a vehicle into such space when it is empty. In order to release the erectable barrier 30 for return to the ground flush position of FIG. 2, one of the lock mechanisms 50 or 60 must be actuated by its respective key 51, 61. As stated heretofore, the key 61 is normally in possession of the tennant to whom the associated vehicle space is assigned. The other key 51, is normally in possession of the manager.

Although the types of locks, 50, 60, latches 42, 43, springs 44, 45, and other components of the present invention described herein are of the preferred form, other types would be suitable. In fact, many variations of the invention can be made by those skilled in the art without departing from the spirit of the invention. Therefore, it is intended that the scope of the invention be limited only by the claims which follow.

We claim:

1. A device for selectively permitting ingress and egress from a vehicle parking space comprising:
   a. housing means buried in the subsurface of said parking space;
   b. erectable barrier means carried by said housing means and movable from a lowered position substantially flush with the surface of said parking space to a raised position whereby ingress and egress of vehicle to and from said space is prevented;

c. cooperating latch means carried by said housing means and said erectable barrier means for releasably maintaining said erectable barrier means in said raised position;
d. release means connected to said latch means for releasing said erectable barrier means for movement from said raised position to said lowered position; and
e. locking means associated with said release means for selectively permitting or preventing operation of said release means.

2. The device of claim 1 in which said locking means comprises a pair of locks connected to said release means, the actuation of either one of which permits operation of said release means.

3. The device of claim 1 wherein said latch means comprises groove means in said housing means and a latch member carried by said erectable barrier means biased toward engagement with said groove means by biasing means, said release means being connected to said latch member for overcoming said bias.

4. The device of claim 3 in which said latch means comprises a second latch member carried by said erectable barrier means biased toward engagement with said groove means by second biasing means, said second latch member having a cam surface thereon allowing said second latch member to be retracted from said groove means as said erectable barrier means is lowered from said raised position to said lowered position, but preventing retraction of said second latch member when an upward force is applied to said erectable barrier means in said raised position.

5. The device of claim 4 in which said locking means comprises a pair of locks connected to said release means, the actuation of either one of which permits operation of said release means to overcome said first latch member bias.

6. The device of claim 5 in which said erectable barrier means is provided with a hole through which said second latch means may be contacted for retraction from said groove to allow removal of said erectable barrier means from said housing means, said hole being blocked by one of said locks until actuation thereof to permit said operation of said release means.

7. A device for selectively permitting ingress and egress from a vehicle parking space comprising:
a. tubular housing means buried in the subsurface of said parking space and having an annular groove on the interior thereof;
b. cylindrical erectable barrier means telescopically carried by said housing means for free rotation therein and for movement from a lowered position substantially flush with the surface of said parking space to a raised position whereby ingress and egress of vehicles to and from said parking space is prevented;
c. latch means carried by said erectable barrier means comprising a latch member biased toward engagement with said groove for releasably maintaining said erectable barrier means in said raised position;
d. release means connected to said latch member for disengaging said latch member from said groove for releasing said erectable barrier means from said raised position; and
e. locking means carried by said erectable barrier means for permitting or preventing operation of said release means.

8. The device of claim 7 in which said locking means comprises a pair of key actuated locking members, actuation of either one of which permits operation of said release means.

9. The device of claim 8 in which said release means comprises cable means attached to said latch member, actuation of either of said locking members permitting a force to be applied to said cable means for disengaging said latch member from said groove.

10. The device of claim 7 in which said latch means comprises a second latch member biased toward engagement with said groove for preventing further upward movement of said erectable barrier means from said raised position, said second latch member having a cam surface thereon for automatic disengagement from said groove on lowering of said erectable barrier means from said raised position to said lowered position.

11. The device of claim 10 in which said locking means comprises a key actuated locking member disposed in a hole in said erectable barrier means, said locking member being removable from said hole on actuation thereof to allow said second latch member to be contacted by tool means for overcoming said bias to allow disengagement of said first latch member and removal of said erectable barrier means from said housing means.

12. The device of claim 11 in which said locking means comprises a second key actuated locking member having means thereon engageable with said release means to prevent its operation, actuation of either one of said locking members permitting operation of said release means to disengage said first latch member from said groove.

13. The device of claim 7 comprising conduit means connected to a drain hole near the bottom of said housing means and extending upwardly therefrom to the surface of said parking space, said barrier means being provided with an annular seal engaging the interior of said housing means for displacing accumulated fluids in said housing means through said conduit means on the lowering of said barrier means from said raised position.

* * * * *